(12) United States Patent
Sujan et al.

(10) Patent No.: US 9,586,573 B2
(45) Date of Patent: Mar. 7, 2017

(54) SYSTEM AND METHOD FOR DETERMINING SMART TORQUE CURVE OPTIMIZING USER PERFORMANCE

(71) Applicant: Cummins, Inc., Columbus, IN (US)

(72) Inventors: Vivek A. Sujan, Columbus, IN (US); Timothy J. Proctor, Columbus, IN (US); Edmund P. Hodzen, Columbus, IN (US); Guoqiang Li, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 260 days.

(21) Appl. No.: 14/302,201

(22) Filed: Jun. 11, 2014

(65) Prior Publication Data

US 2015/0361915 A1    Dec. 17, 2015

(51) Int. Cl.
| | | |
|---|---|---|
| B60W 10/06 | (2006.01) | |
| B60W 10/10 | (2012.01) | |
| F02D 9/02 | (2006.01) | |
| F02D 29/02 | (2006.01) | |
| F02D 41/02 | (2006.01) | |
| F02D 41/24 | (2006.01) | |
| F02D 41/26 | (2006.01) | |
| F02D 41/00 | (2006.01) | |

(52) U.S. Cl.
CPC ............ *B60W 10/10* (2013.01); *B60W 10/06* (2013.01); *F02D 9/02* (2013.01); *F02D 29/02* (2013.01); *F02D 41/0002* (2013.01); *F02D 41/0225* (2013.01); *F02D 41/2412* (2013.01); *F02D 41/2432* (2013.01); *F02D 41/26* (2013.01); *B60W 2510/10* (2013.01); *B60W 2530/10* (2013.01); *B60W 2710/0666* (2013.01); *F02D 2200/50* (2013.01); *F02D 2200/60* (2013.01); *F02D 2200/604* (2013.01); *F02D 2200/606* (2013.01); *F02D 2200/70* (2013.01); *F02D 2200/702* (2013.01); *F02D 2250/26* (2013.01); *Y02T 10/42* (2013.01)

(58) Field of Classification Search
None
See application file for complete search history.

(56) References Cited

U.S. PATENT DOCUMENTS

| | | | |
|---|---|---|---|
| 6,567,734 B2 | 5/2003 | Bellinger et al. | |
| 6,957,139 B2 | 10/2005 | Bellinger | |
| 7,440,832 B2 | 10/2008 | Steen et al. | |
| 2004/0002806 A1 | 1/2004 | Bellinger | |
| 2010/0031923 A1* | 2/2010 | Weng | F02D 35/027 123/406.24 |
| 2011/0106388 A1 | 5/2011 | Boeckenhoff et al. | |

(Continued)

*Primary Examiner* — Edwin A Young
(74) *Attorney, Agent, or Firm* — Foley & Lardner LLP

(57) ABSTRACT

Systems and methods for controlling performance characteristics of a vehicle are provided. A system for controlling performance characteristics of a vehicle includes a memory storage device including at least one torque curve profile stored thereon. The at least one torque curve profile includes a mapping of accessible torque for the vehicle with respect to an engine speed of an engine coupled to the vehicle. The system also includes an electronic control unit operatively coupled to the memory storage device, the electronic control unit configured to re-map the at least one torque curve profile in response to receipt by the electronic control unit of an electronic signal indicating a change in a vehicle condition.

23 Claims, 9 Drawing Sheets

(56) References Cited

U.S. PATENT DOCUMENTS

2011/0238255 A1\* 9/2011 Sano ................... B60R 16/0232
　　　　　　　　　　　　　　　　　　　　　　　701/31.4
2012/0197504 A1　　8/2012 Sujan et al.
2012/0218094 A1　　8/2012 Lee et al.

\* cited by examiner

SYSTEM AND METHOD FOR DETERMINING SMART TORQUE CURVE OPTIMIZING USER PERFORMANCE

TECHNICAL FIELD

This present disclosure relates to controlling vehicle performance. More particularly the present disclosure relates to vehicular torque optimization.

BACKGROUND

As a vehicle traverses a given route, the performance of the vehicle can be significantly influenced by the way an operator causes a vehicle to operate. For instance, an aggressive operator may elect to "push" a vehicle through various gears while still maintaining the operation of the vehicle within the legally defined speed limits. However, in "pushing" the vehicle, though the operator may achieve an objective of not exceeding legal speed limits while traversing the route, the operator may still fail another objective of achieving a maximum potential fuel economy potential during the trip.

Torque curves of an engine may be relied upon to direct the performance and capability of a vehicle. However, as the engine speed of the vehicle varies within its mechanical limits during operation by an operator, an end user may be unable to achieve optimal performance benefits of the vehicle from the engine torque curve.

SUMMARY

Various embodiments provide systems and methods for controlling performance characteristics of a vehicle.

Particular embodiments provide a system for controlling performance characteristics of a vehicle that includes a memory storage device including at least one torque curve profile stored thereon. The at least one torque curve profile includes a mapping of accessible torque for the vehicle with respect to an engine speed of an engine coupled to the vehicle. The system also includes an electronic control unit operatively coupled to the memory storage device, the electronic control unit configured to re-map the at least one torque curve profile in response to receipt by the electronic control unit of an electronic signal indicating a change in a vehicle condition.

Particular embodiments provide a system for controlling performance characteristics of a vehicle that includes a memory storage device including a plurality of torque curve profiles stored thereon. The plurality of torque curve profile includes a mapping of accessible torque for the vehicle with respect to an engine speed of an engine coupled to the vehicle. The system also includes an electronic control unit operatively coupled to the memory storage device. The electronic control unit is configured to select at least one torque curve profile from the plurality of torque curve profiles in response to receipt by the electronic control unit of a signal corresponding to a change in a vehicle condition. The electronic control unit is further configured to cause the engine coupled to the vehicle to perform based on the selected at least one torque curve profile.

Particular embodiments provide a method of controlling performance characteristics of a vehicle. The method includes receiving, by an electronic control unit coupled to the vehicle, an electronic signal corresponding to a value for a change in a vehicle condition. The method also includes remapping, by the electronic control unity, a torque curve profile of the vehicle in response to receipt by the electronic control unit of the electronic signal corresponding to the value for the change in the vehicle condition. The torque curve profile includes a mapping of accessible torque for the vehicle with respect to an engine speed of an engine coupled to the vehicle and wherein the remapping includes changing at least one value of the accessible torque with respect to the engine speed. The method includes causing the vehicle to perform based on the re-mapped torque curve profile.

Particular embodiments provide an engine system for controlling performance characteristics of a vehicle. The engine system includes an engine coupled to the vehicle, a memory storage device coupled to the vehicle, and an electronic control unit operatively coupled to the memory storage device. The memory storage device includes at least one torque curve profile stored thereon. The at least one torque curve profile includes a mapping of accessible torque for the vehicle with respect to an engine speed of the engine. The electronic control unit is configured to re-map the at least one torque curve profile in response to receipt by the electronic control unit of an electronic signal indicating a change in a vehicle condition.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive systems, and methods for controlling performance characteristics of a vehicle. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
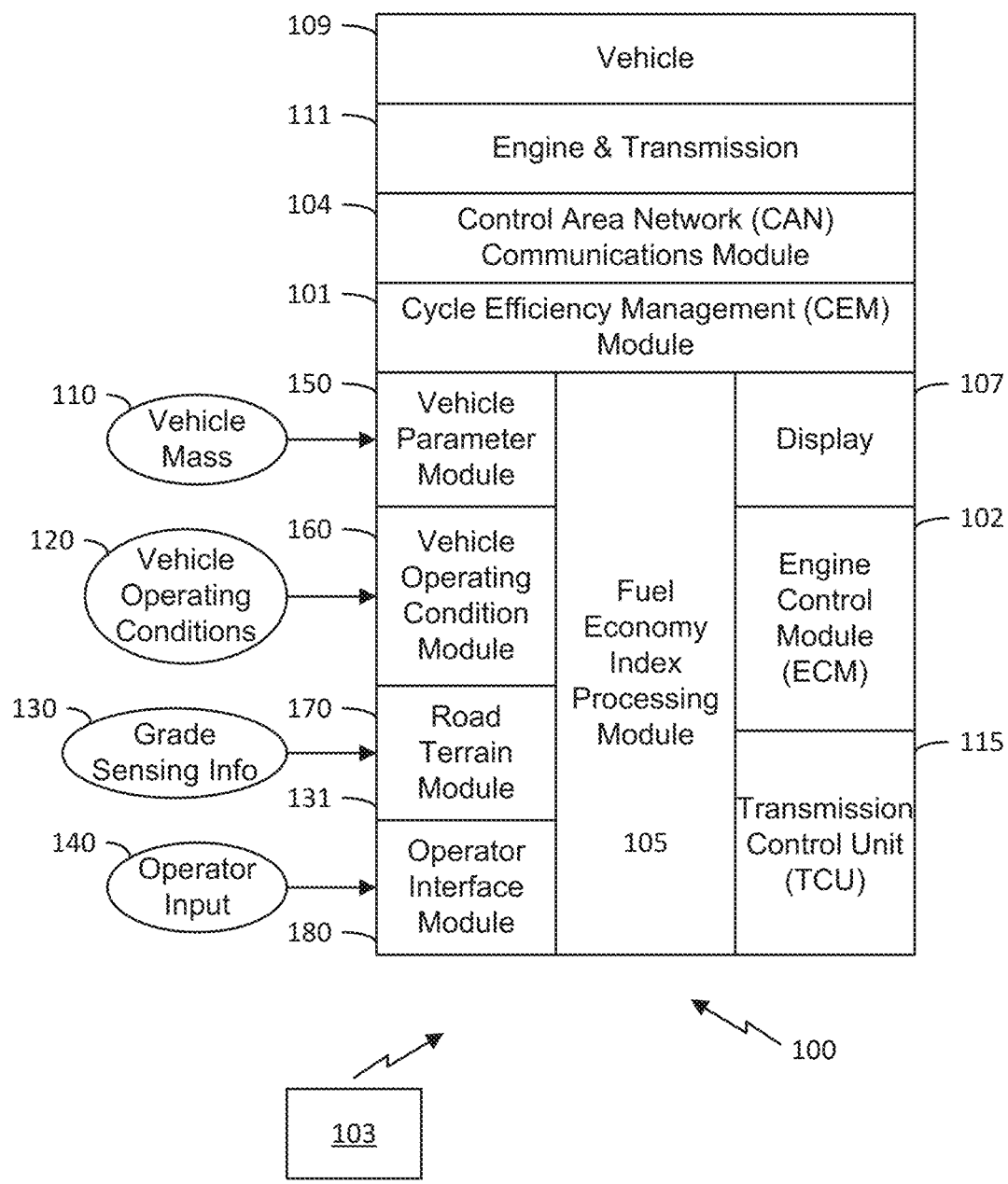
FIG. 1 is an exemplary system diagram for a vehicle smart-torque management system for reducing fuel consumption, in accordance with example embodiments.

FIG. 1 is an exemplary system diagram for a vehicle smart-torque management system for controlling performance characteristics of a vehicle. System 100 is configured for integration integrated into a vehicle 109, such as a truck or automobile, having an engine and transmission 111 including a plurality of gears into which the transmission can be shifted automatically by a transmission control unit 115 or manually by a driver of the vehicle. System 100 is configured to re-map a torque curve profile of an engine of a vehicle, for example via engine control module 102, in response to a change in a vehicle condition. The torque curve or torque curve profile maps accessible torque for the vehicle with respect to an engine speed of an engine coupled to the vehicle.

In particular embodiments, system 100 controls performance characteristics of a vehicle to reduce fuel consumption. Vehicle Mass 110, optionally current vehicle operating conditions 120, grade sensing information 130, and operator input 140 are input into a CEM module 101 via control area network (CAN) communications module 104, then used by a fuel economy index processing optimization module 105 to determine a recommended and optimized torque curve in relation to an initial torque curve from the vehicle parameters. In addition to other components, CEM module 101 may contain vehicle fuel economy-based operational cost optimization module 105, and may also include a central processor and database. Communication equipment/modules 104 can be provided to enable other input data to be transmitted to the central processor for monitoring and control. CEM module 101 may include a vehicle parameter module 150 adapted to receive vehicle parameters 110, a vehicle operating condition module 160 adapted to receive current vehicle operating conditions 120, a grade sensing module 170 adapted to receive sensed grade information 130, and an operator interface module 180 to receive operator input 140. Computer storage 103 may be downloaded to the CEM module, including but not limited to a memory storage device, prior to the start of a trip or transmitted wirelessly over-the-air at any time, for example, by using cellular technology.

In operation, the operator may program one or more preferences for how they desire the vehicle to behave during the course of the route in relation to fuel economy desired such as max/min torque limits, power limits and governed speed. Using this control mode, the operator can, amongst other things, specify preferences. Exemplary embodiments provide for managing the vehicle operating condition to optimize fuel consumption given the initial engine map, the vehicle operational conditions to determine a dynamic, optimized engine map for controlling torque, power and/or engine speed.

In certain embodiments, the system 100 further includes a controller structured to perform certain operations to controlling performance characteristics of a vehicle. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 1.

Example and non-limiting module implementation elements include sensors providing any value determined herein, sensors providing any value that is a precursor to a value determined herein, a datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Figure 2:
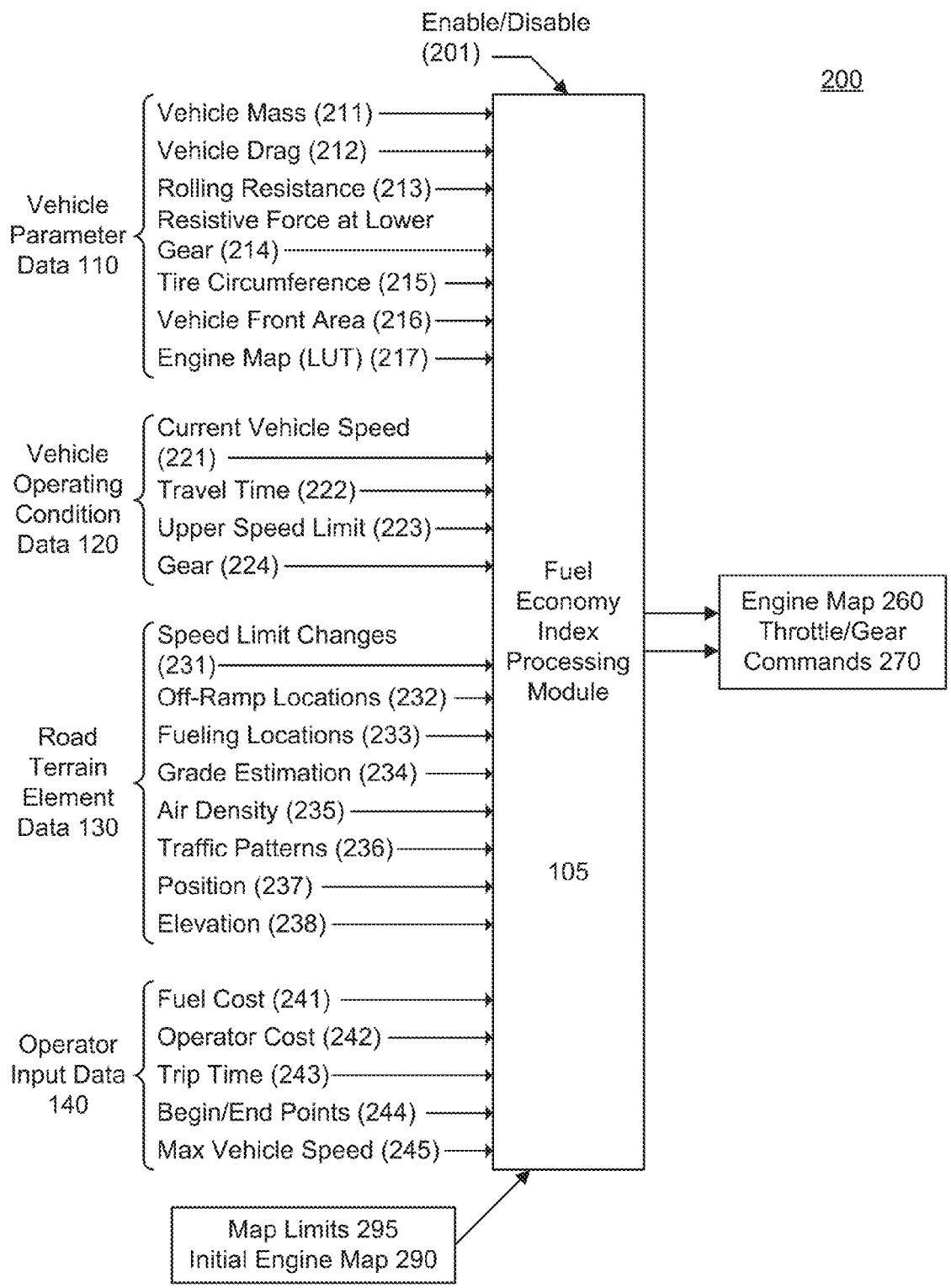
FIG. 2 is an input/output flow diagram for a fuel economy index processing module, in accordance with example embodiments.

FIG. 2 is an input/output flow diagram 200 for a fuel economy index processing module 105 in accordance with example embodiments. FIG. 2 illustrates various available system inputs to the optimization module 105, which processes at least the vehicle mass, road grade and gearing inputs to determine an optimized dynamic engine map 260, for optimized performance and cost. The module also receives an initial engine map 290 and operator limit rules 295. System inputs are received by CEM module 101, which then enables the optimization module 105 via an enable/disable signal 201. The enable/disable signal 201 provides for disabling a system according to example embodiments in response to an operator-initiated event, if needed. Data indicative of at least vehicle mass 211, gear 224, grade estimation 234, initial engine map 290 and operator limit rules 295 are received as an input to the optimization module 105 via CEM module 101. The modules process the inputs to determine an optimal engine map 260 and commands associated with gearing and throttle 270 in relation to inputs received.

Figure 3:
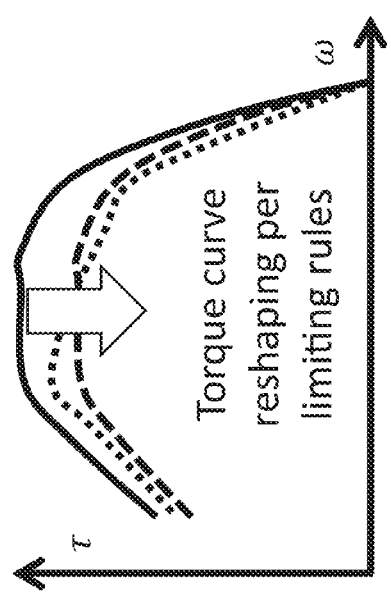
FIG. 3 sets forth a basic functional relation of the operation of the approach of one or more example embodiments.

FIG. 3 sets forth a basic functional relation of the operation 300 of the approach of one or more example embodiments. From FIG. 3, a brake thermal efficiency (BTE) map (or engine map) 310, reflecting accessible engine torque with respect to engine speed (torque curve), is initially determined in relation to an operational characteristics of the vehicle and its engine. Once determined the initial BTE map is used to determine basic parameters of performance concerning the vehicle. A vehicle analysis is then obtained, for example by simulation, to determine operational performance characteristics of the vehicle at 320 for a change in one or more vehicle conditions. For instance, using known conditions of the vehicle, including, but not limited to, grade, mass, and gear, the vehicle analysis may be simulated to determine vehicle performance pursuant to a change in one or more of the conditions. From the simulation, these encountered operating conditions may then be used by at 330 to further determine one or more performance functions as a function of performance criteria at 340 in relation to limiting one or more of system torque, engine speed, and governed engine speed.

Figure 4:
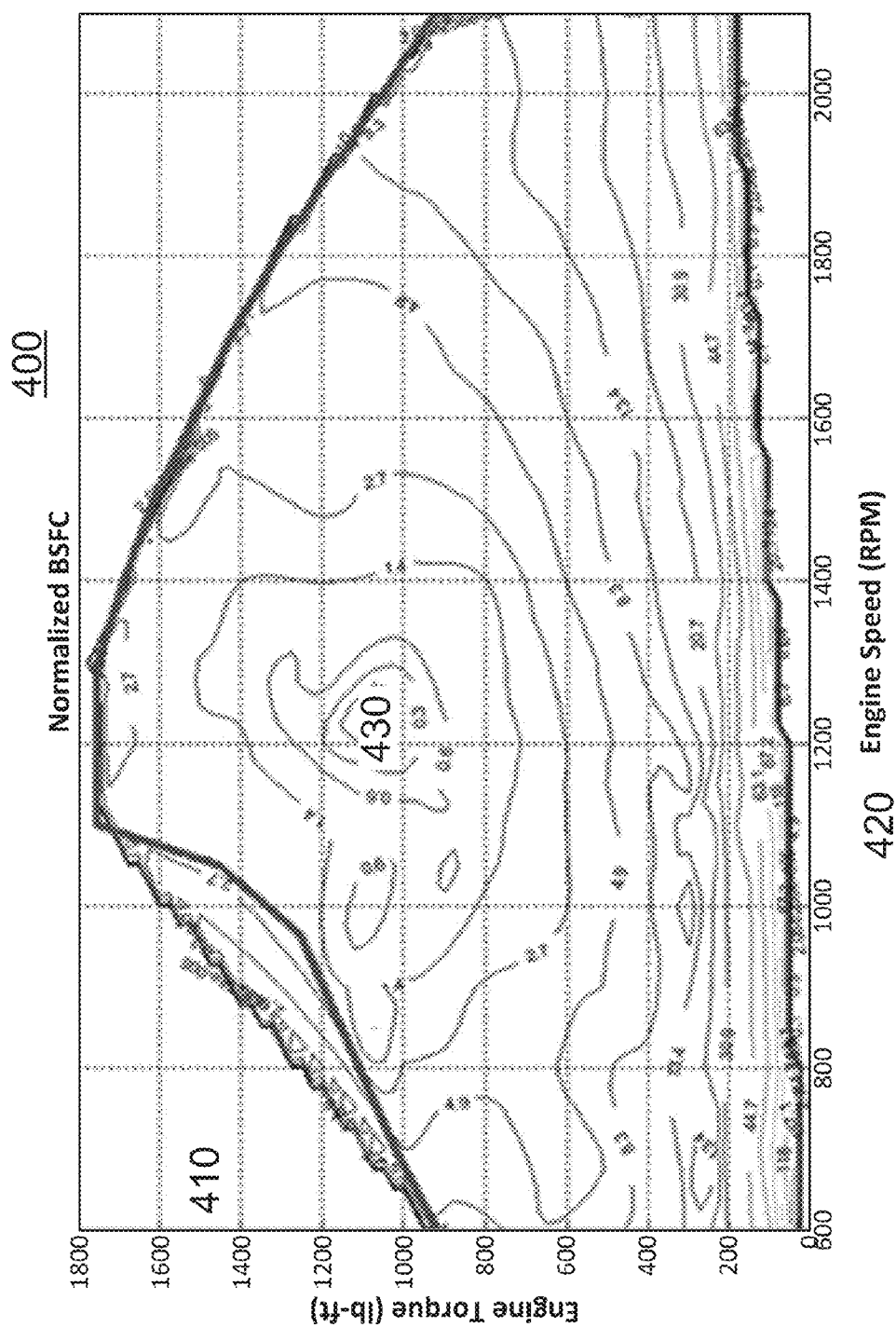
FIG. 4 sets forth an example of an initial BTE map for a predetermined engine and vehicle.

FIG. 4 sets forth an example of an initial BTE map 400 for a predetermined engine and vehicle. From FIG. 4, the initial BTE relates system torque (engine torque) 410 with engine speed 420 in an arrangement of torque curves, generally throughout 430.

Figure 5:
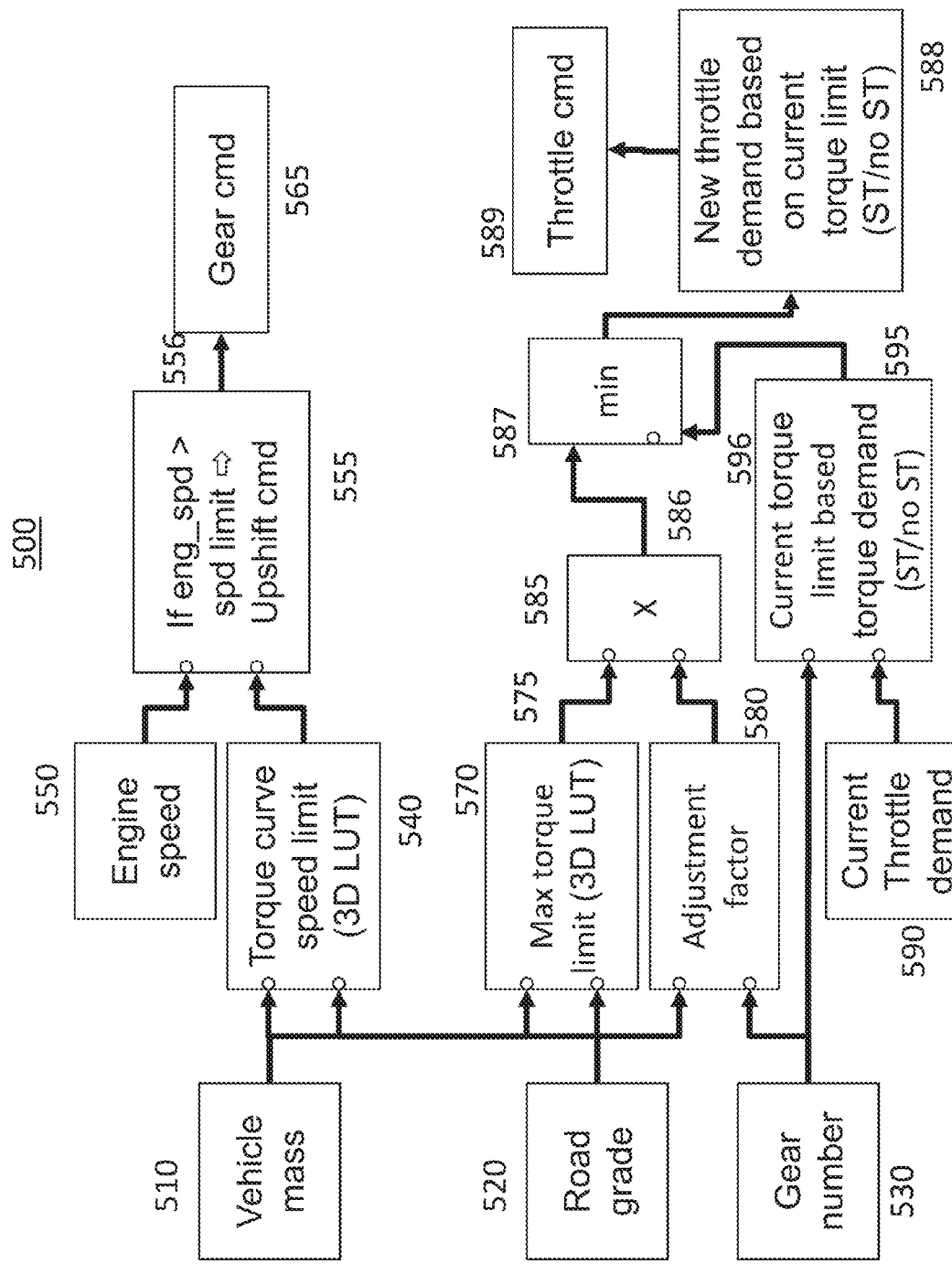
FIG. 5 depicts a flowchart of the methods and processes, in accordance with example embodiments, in which vehicle operating conditions of vehicle mass, road grade estimation/sensing and gear number are inputs used by the fuel economy index processing module, along with limiting rules for the initial engine map, to determine a gear command and a throttle command for a vehicle.

FIG. 5 depicts a flowchart 500 of various methods and processes implemented in accordance with particular embodiments, in which vehicle operating conditions of vehicle mass, road grade estimation/sensing and gear number are inputs used by the fuel economy index processing module, along with limiting rules for the initial engine map, to determine a gear command and a throttle command for a vehicle. From FIG. 5, vehicle mass 510, road grade sensing estimation 520 and gear number 530 are vehicle operational conditions input to the module 500. The vehicle mass 510 and road grade estimate 520 are input to the Torque Curve speed limit module 540, which also has a 3D look up table (LUT) and the output 545 is compared with the engine speed 550 of the vehicle at 555, during a simulated or operational state. If the engine speed is greater than the speed limit at 555, then an upshift command is generated at 560 and a gear command indicating the upshift command is produced by the module ay 565.

From FIG. 5, the vehicle mass 510 and road grade estimate 520 are also input to the Max Torque limit module 570, which also has a 3D look up table (LUT) and the output 575 is multiplied at 585 by an adjustment factor 580 determined from input of all of the vehicle mass, road grade sensing and gear number. The minimum value of a comparison of the output of at 586 and the current torque limit based on torque demand of 595 (with current throttle demand as input at 590) output at 596 is determined at 587 and a new throttle demand may be determined at 588, thereby generating a throttle command at 589. In particular embodiments, a direct override to the torque curve is provided at 588.

One or more alternative embodiments may also substitute comparing one or more of maximum governed speed and maximum power for the maximum torque limit at 575. In further embodiments, it is envisioned that two or more of maximum governed speed, maximum power, and maximum torque limit may be provided for using a LUT at 575.

Figure 6:
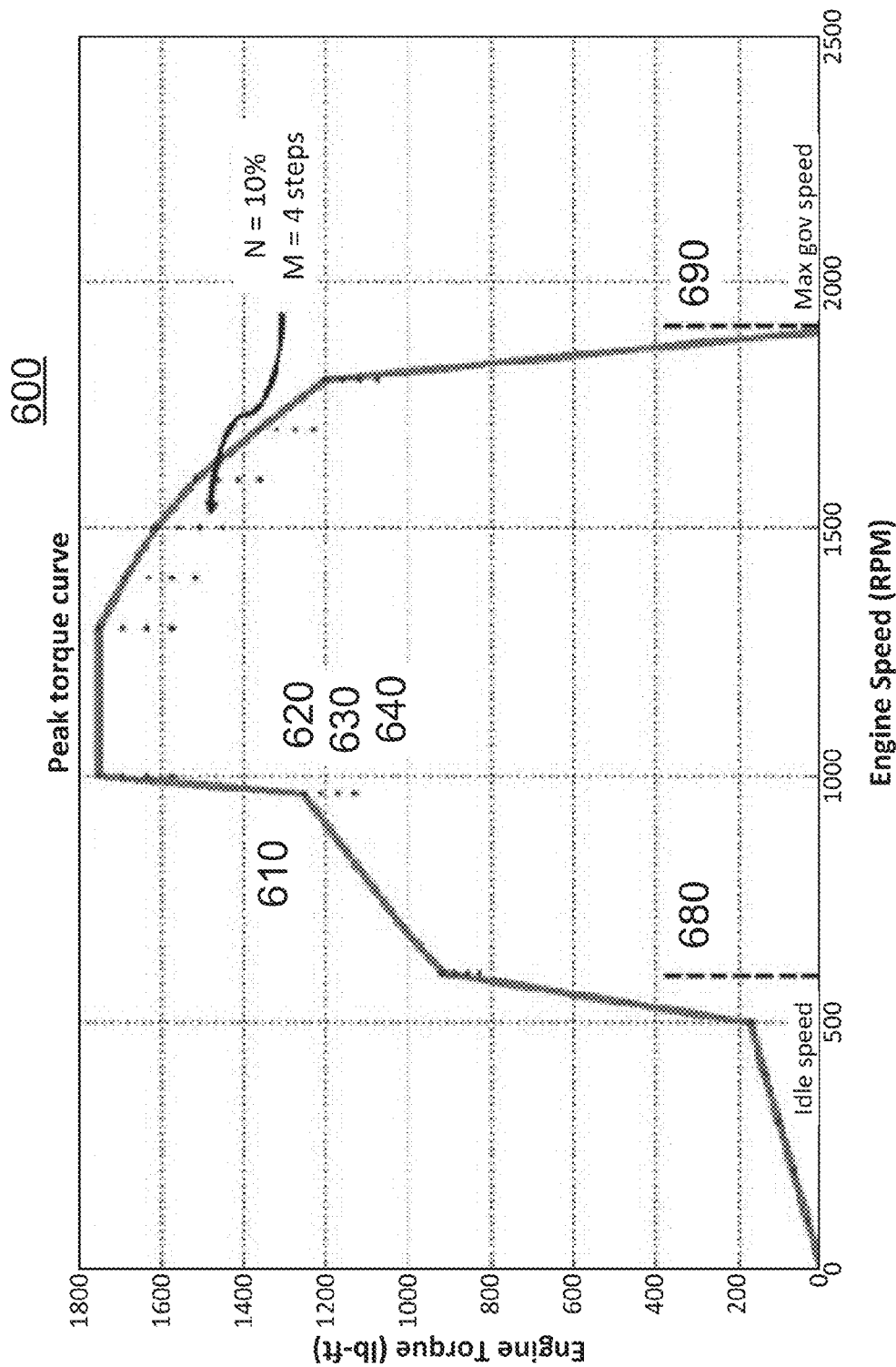
FIG. 6 sets forth a modified BTE (without limiting rules) having a set of possible reductions in torque in relation to engine speed for a standard BTE, a predetermined decrease in torque can be utilized, or set by a user, to determine associated engine speeds and the steps associated with such reductions.

FIG. 6 sets forth a modified BTE (without limiting rules) 600 having a set of possible reductions in torque in relation to engine speed for a standard BTE, such as that of FIG. 4. From FIG. 6, a predetermined decrease in torque can be utilized, or set by a user, to determine associated engine speeds and the steps associated with such reductions. For instance, at 610, a predetermined torque reduction of less than N % is shown for each of four steps. For example, N may represent a 10% reduction, and this may be operator input or predetermined. At 610, the engine speed is constant at 1000 rpms, but the torque is step-wise reduced over steps. Similarly, at 620, 630, and 640 similar step-wise reductions are determined, by particular embodiments. The BTE of 600 is without limiting rules, as depicted, as there are numerous options to assess before limiting rules are assessed. An idle speed and a maximum governed speed are also set forth at 680 and 690.

Figure 7:
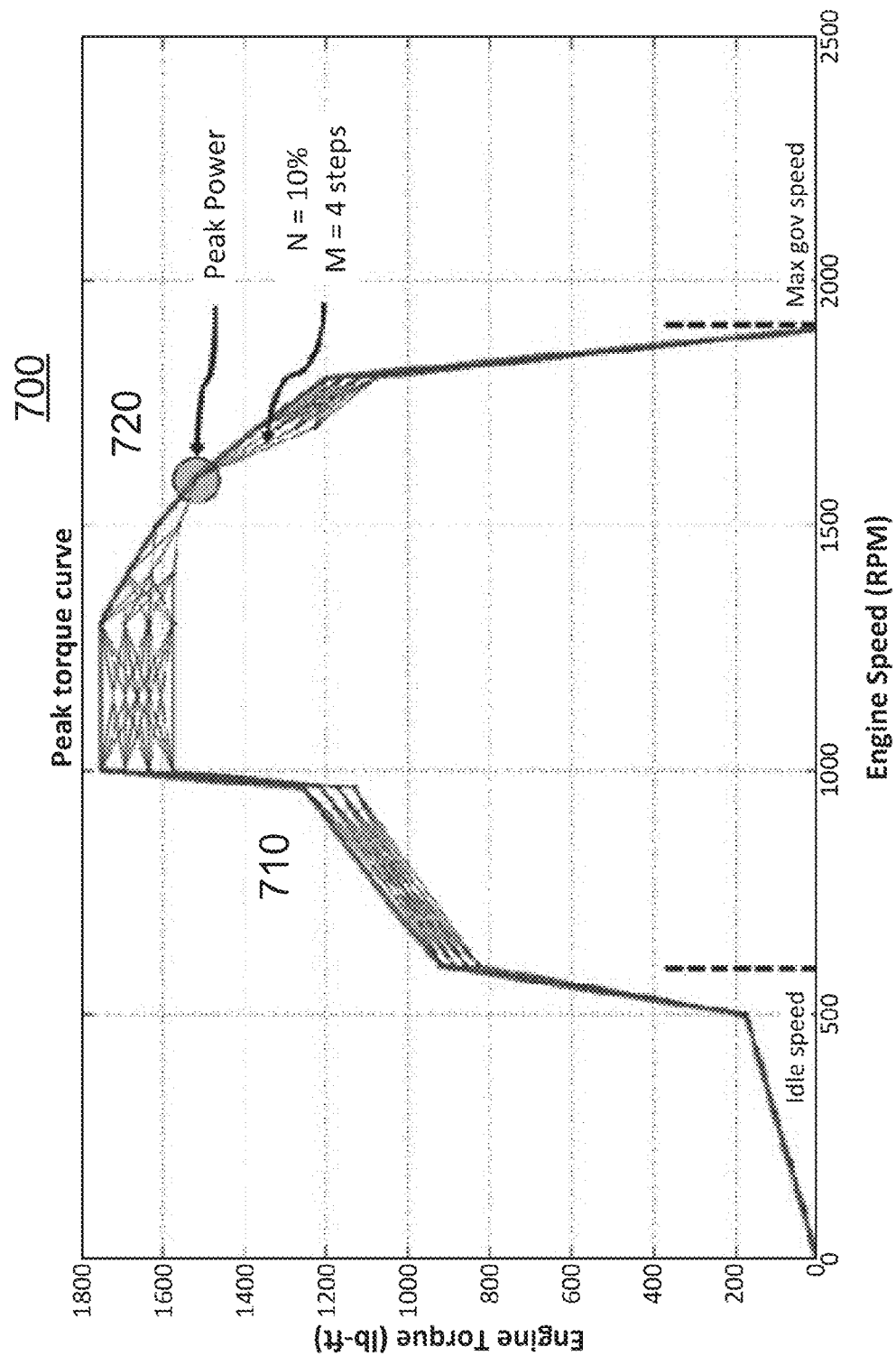
FIG. 7 sets forth a modified BTE (with limiting rules) having a set of associated reductions.

FIG. 7 sets forth a modified BTE (with limiting rules) 700 having a set of associated reductions, using, for example the modified BTE without limiting rules of FIG. 6. From FIG. 7, the modified BTE reflects the step-wise reductions for each of the predetermined torque reductions at constant speed, and associates each point in relation to another, such as at 710. A predetermined peak power at a predetermined speed is used, for example, as one of a variety of limiting rules, at 720. The peak power identified for this particular case reflects a peak power at approximately 1550 ft-lb of torque and 1600 rpms. A peak power using other operator preferences can also be similarly predetermined along the modified BTE example. Similarly, an input used in the fuel economy index processing module of various embodiments may be used to determine limiting rules for a determination of the updated engine map.

Figure 8:
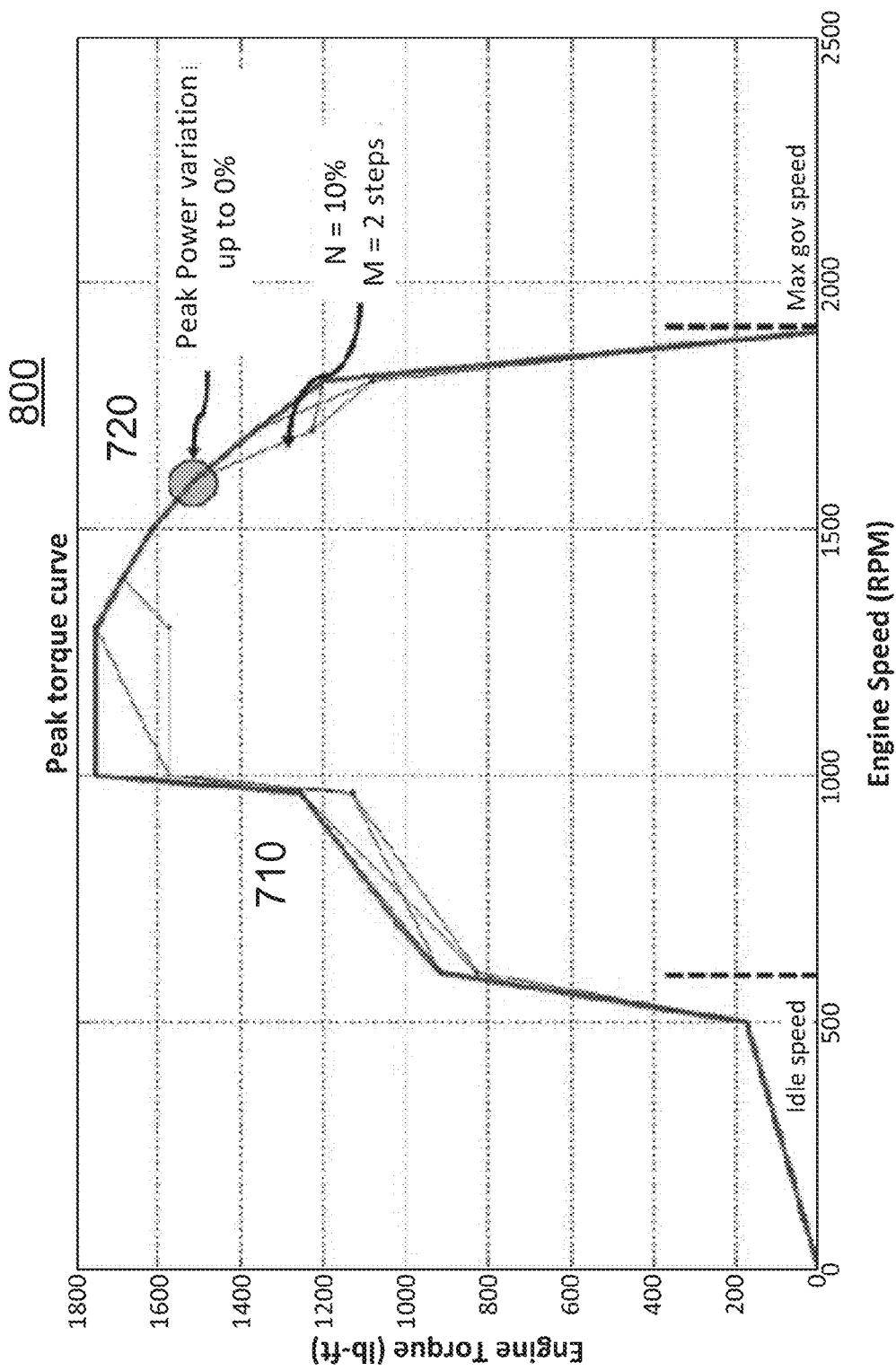
FIG. 8 sets forth a further modified BTE with limiting rules where the torque curves have been further optimized, in accordance with example embodiments.

FIG. 8 sets forth a further modified BTE with limiting rules where the torque curves have been further optimized. At 810, the peak power is maintained such that there is no variation previously, however it is envisioned that variations may be used. At 820, the prior four-step approach of FIG. 8 is optimized to two steps, maintaining a 10% reduction objectives (where N=10%). Accordingly, a dynamic modified BTE is available for use by to better control the fuel consumption in relation to the torque, power and speed.

Exemplary embodiments provide for engine torque, speed and power data to be supplied by an engine torque, speed and power data look-up table (LUT) containing the requisite engine data for the assigned engine and vehicle.

Various embodiments also provides for an integrated solution with a transmission so as to provide for a plurality of gears into which the transmission can be shifted automatically by a transmission control unit and throttle controlled, or manually by a driver of the vehicle, in relation to the throttle and gear commands generated. Similarly, knowing the vehicle's power train system, such as the driveline ratio, gear ratio, driveline system losses, etc., engine speed and torque can be converted to vehicle speed and transmission gear at a certain grade. Thus, an engine fuel map LUT can be obtained from an engine friction map LUT.

Figure 9:
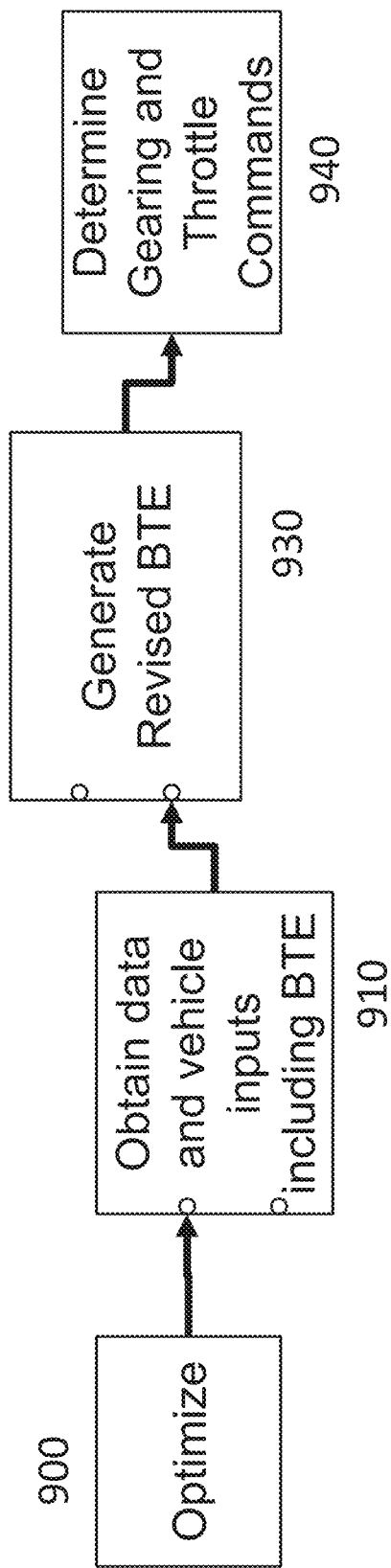
FIG. 9 sets forth a flowchart for determining the reduced fuel consumption of a vehicle using one or more example embodiments.

FIG. 9 sets forth a flowchart for determining the reduced fuel consumption of a vehicle in one or more embodiments. Prior to deployment, the vehicle's fuel economy index processing module is initialized with a planned route and vehicle data at initialization 900. The system 900 can be initialized prior to the operator's arrival or initiated by an action of the operator, such as, for example, pressing a button on a user interface to start the optimization. An operator, or an external source such as a central database, supplies the vehicle with a trip destination and planned route and trip time; known vehicle mass, road grade sensing information and gearing number and relations are provided as input via the operator, a database, or data vendor, as described above, are input at 910. Exemplary embodiments provide for the operator to enter vehicle parameters and preferences for how the vehicle should behave on the route in relation to fuel economy objectives. Alternatively, or in conjunction with operator entry, vehicle parameters can be provided by a database containing vehicle information. In one or more preferred embodiments, additional information such as road terrain element data, speed limit changes and fueling station locations can also be obtained and provided as input.

From the inputted data 910 including that of the mapping limits and initial BTE for the vehicle's engine, an overlay of limiting rules can be determined on the initial BTE map, to generate a reshaped BTE map having limiting rules 920. Using operator or database initiated preferences for selecting stops along the BTE map and other limiting rules, an optimized BTE map is generated 930. In one or more preferred embodiments, an operator or database-sourced set of weighted performance characteristics, based on vehicle operation performances, can be determined in relation to fuel consumption objectives can further be applied to the BTE map generated in step 930 so as to generate a further refined BTE map. In particular embodiments, the optimized BTE map is then used as the primary index for the operation of the vehicle so as to deliver improved fuel consumption at 940 via gearing and throttle commands. In particular embodiments, a gearing determination and a torque command are provided at 940.

From the optimized BTE map generated, gear commands, throttle commands and other performance-driven commands can be generated to reduce the fuel consumption of the vehicle as it traverses along it planned route.

As used herein, power demanded by a vehicle is a function, primarily, of the vehicle operating condition, which, among other things, includes vehicle mass, vehicle speed, rolling resistance and transmission gear, coupled with the instantaneous road conditions (grade, drag, wind speed, air density, etc.). For example, if either the speed or grade drops/decreases by traveling at a lower speed or going downhill, less power will be required for the vehicle to traverse a given distance. Accounting for system inefficiencies, power can be translated into engine torque and the vehicle's system of gears translates vehicle speed to engine speed. Thus, by knowing power demand, vehicle speed, and transmission gear, which when coupled with engine speed and torque, a particular point on the engine map can be identified. A change in engine speed location on the engine map will require a change in engine torque to achieve the same output power. And for a given point on the engine map, a certain amount of fuel will be required. Thus, by changing the engine speed and torque point, the amount of fuel needed to provide the same output power varies. Exemplary embodiments employ mathematical techniques to identify the minimum value of the cost function in traversing the engine map.

Outputs of the optimization module include a determination of the vehicle operating condition, namely, a recommended gearing and throttle via commands, and an optimized BTE.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

In the claims, as well as in the specification above, all transitional phrases such as "comprising," "including," "having," "involving," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A system for controlling performance characteristics of a vehicle, the system comprising:
    a memory storage device including at least one torque curve profile stored thereon, the at least one torque curve profile including a mapping of accessible torque for the vehicle with respect to an engine speed of an engine of the vehicle; and
    an electronic control unit operatively coupled to the memory storage device, the electronic control unit configured to:
        re-map the at least one torque curve profile in response to receipt by the electronic control unit of an electronic signal indicating a change in a vehicle condition, wherein the remapped at least one torque curve profile is remapped based on a predetermined peak power for the engine; and
        control operation of the engine based on the remapped at least one torque curve profile.

2. The system of claim 1, wherein the electronic control unit is configured to re-map the at least one torque curve profile to increase the fuel efficiency of the vehicle.

3. The system of claim 1, further comprising at least one sensor operatively coupled to the electronic control unit, the at least one sensor configured to generate the electronic signal in response to a change in grade along a path of travel of the vehicle.

4. The system of claim 1, further comprising at least one sensor operatively coupled to the electronic control unit, the at least one sensor configured to generate the electronic signal in response to a change in a mass of the vehicle.

5. The system of claim 1, further comprising at least one sensor operatively coupled to the electronic control unit, the at least one sensor configured to generate the electronic signal in response to a change in a gear of the vehicle.

6. The system of claim 1, wherein the vehicle condition includes a drag coefficient of the vehicle.

7. The system of claim 1, wherein the vehicle condition includes a change in a throttle request.

8. The system of claim 1, wherein the vehicle condition includes a rate of change in torque of the vehicle.

9. The system of claim 1, wherein the vehicle condition includes an electrical load of the vehicle.

10. The system of claim 1, wherein the electronic control unit is configured to re-map the at least one torque curve profile to obtain an identified time for the vehicle to accelerate from a first speed to a second speed.

11. The system of claim 1, wherein the electronic control unit is configured to re-map the at least one torque curve profile to maintain the vehicle below an imposed torque limit, the imposed torque limit set at a predetermined safety factor below an actual torque limit of the engine of the vehicle.

12. A system for controlling performance characteristics of a vehicle, the system comprising:
    a memory storage device including a plurality of torque curve profiles stored thereon, the plurality of torque curve profiles including a mapping of accessible torque for the vehicle with respect to an engine speed of an engine of the vehicle; and
    an electronic control unit operatively coupled to the memory storage device, the electronic control unit configured to select at least one torque curve profile from the plurality of torque curve profiles in response to receipt by the electronic control unit of a signal corresponding to a change in a vehicle condition, wherein the selected at least one torque curve profile is selected based on a predetermined peak power for the engine, the electronic control unit further configured to cause the engine coupled to the vehicle to perform based on the selected at least one torque curve profile.

13. The system of claim 12, further comprising at least one sensor operatively coupled to the electronic control unit, the at least one sensor configured to generate the electronic signal in response to a change in one or more of a grade along a path of travel of the vehicle, a mass of the vehicle, and a gear of the vehicle.

14. A method of controlling performance characteristics of a vehicle, the method comprising:
    receiving, by an electronic control unit of the vehicle, an electronic signal corresponding to a value for a change in a vehicle condition;
    remapping, by the electronic control unit, a torque curve profile of the vehicle in response to receipt by the electronic control unit of the electronic signal corresponding to the value for the change in the vehicle condition, wherein the torque curve profile includes a mapping of accessible torque for the vehicle with respect to an engine speed of an engine of the vehicle, wherein the remapping includes changing at least one value of the accessible torque with respect to the engine speed, and wherein the remapped torque curve profile is remapped based on a predetermined peak power for the engine; and
    causing the vehicle to perform based on the re-mapped torque curve profile.

15. The method of claim 14, wherein the vehicle condition includes a grade of a path upon which the vehicle is traveling.

16. The method of claim 14, wherein the vehicle condition includes a mass of the vehicle.

17. The method of claim 14, wherein the vehicle condition includes a gear of a transmission coupled to the engine of the vehicle.

18. The method of claim 14 wherein causing the vehicle to perform based on the re-mapped torque curve profile includes changing at least one gear shift point of a transmission operatively coupled to the engine.

19. The method of claim 14 wherein the torque curve profile is remapped to increase fuel efficiency of the vehicle.

20. The method of claim 14, wherein causing the vehicle to perform based on the re-mapped torque curve profile includes reducing the accessible torque at a particular engine speed.

21. The method of claim 14, wherein causing the vehicle to perform based on the re-mapped torque curve profile includes reducing the engine speed in response to a particular torque request.

22. An engine system for controlling performance characteristics of a vehicle, the engine system comprising:
   an engine;
   a memory storage device, the memory storage device including at least one torque curve profile stored thereon, the at least one torque curve profile including a mapping of accessible torque for the vehicle with respect to an engine speed of the engine; and
   an electronic control unit operatively coupled to the memory storage device, the electronic control unit configured to re-map the at least one torque curve profile in response to receipt by the electronic control unit of an electronic signal indicating a change in a vehicle condition, wherein the remapped at least one torque curve profile is remapped based on a predetermined peak power for the engine; and the electronic control unit is further configured to control operation of the engine based on the remapped at least one torque curve profile.

23. The engine system of claim 22, wherein the vehicle condition includes one of a grade of the vehicle, a mass of the vehicle, and a gear of the vehicle.

\* \* \* \* \*